O. TOLLAGSEN.
PERCOLATOR.
APPLICATION FILED JULY 1, 1916.
1,418,850.
Patented June 6, 1922.
2 SHEETS—SHEET 2.
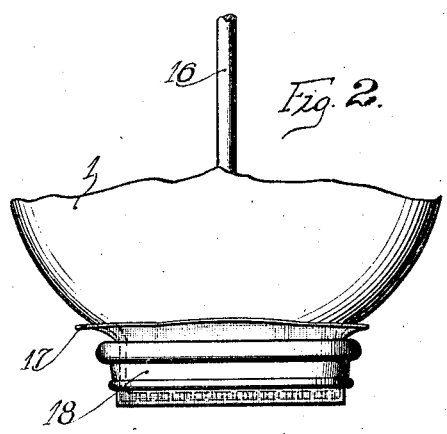
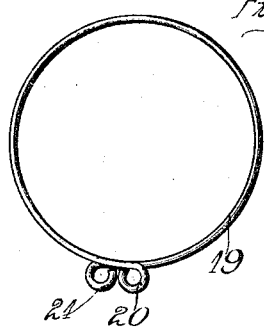
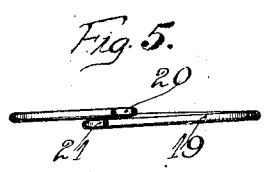
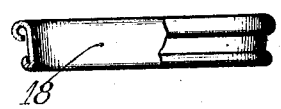
Inventor
Olaf Tollagsen
By Brown, Hanson & Boettcher
Attorneys

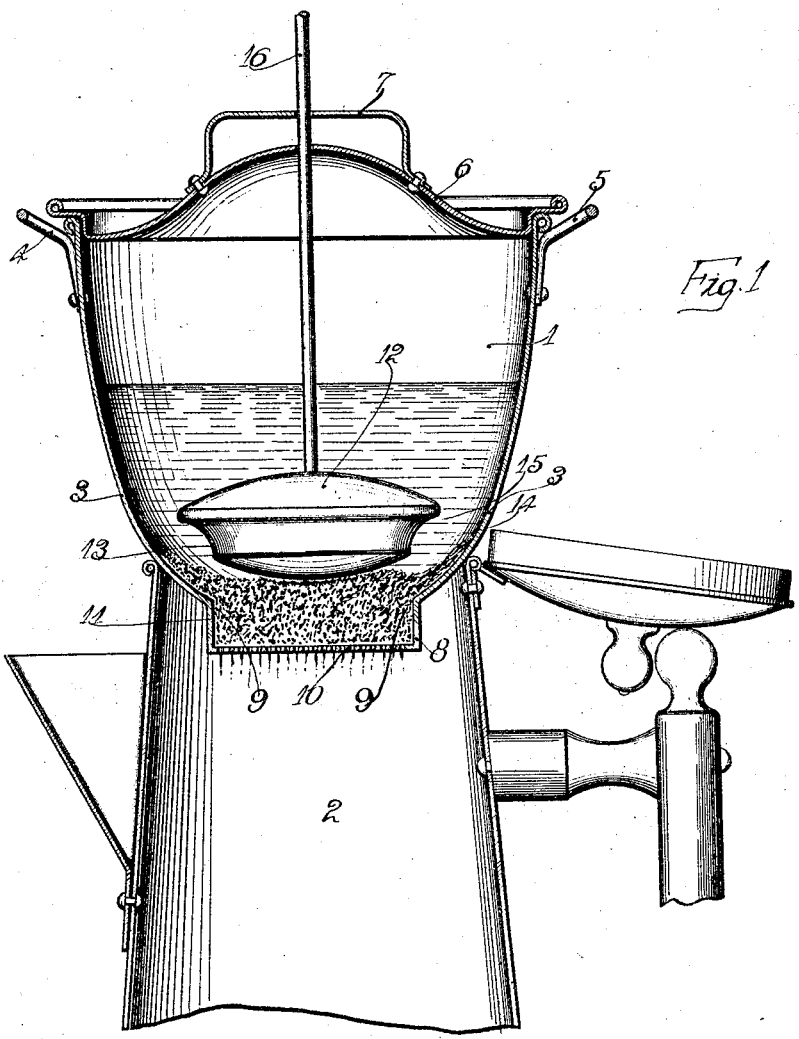

UNITED STATES PATENT OFFICE.

OLAF TOLLAGSEN, OF CHICAGO, ILLINOIS.

PERCOLATOR.

1,418,850.  Specification of Letters Patent.  Patented June 6, 1922.

Application filed July 1, 1916. Serial No. 107,027.

*To all whom it may concern:*

Be it known that I, OLAF TOLLAGSEN, a citizen of the United States, residing at Chicago, in the county of Cook and State of Illinois, have invented a certain new and useful Improvement in Percolators, of which the following is a full, clear, concise, and exact description, reference being had to the accompanying drawings, forming a part of this specification.

My invention relates to a percolator for preparing tea, coffee and similar beverages.

My invention belongs to that class of percolators which comprise an upper mixing or preparing chamber and a lower container or pouring section, the two sections being separated by some form of valve which closes off the two chambers during the time that the beverage is being prepared and which valve is opened to discharge the beverage from the mixer section into the container section. These devices have not come into extensive use because of the complicated and inconvenient nature of the mechanism heretofore proposed.

The device which I have illustrated in the accompanying drawings and which I shall describe in detail later comprises an attachment or independent vessel to be used in connection with a containing receptacle such as a coffee pot, tea pot or the like. To this end the device is formed and constructed to be usable with different sizes and shapes of containing pots.

My invention is chiefly concerned with the simplification of the structure of this type of mechanism, securing all of the necessary functions with a minimum of material and providing a convenient and inexpensive article of this class.

In the accompanying drawings—

Figure 1 is a vertical section of one form of my device showing the same applied to a coffee pot;

Figure 2 is a fragmentary view illustrating the manner of applying a cross strainer to the bottom of the vessel;

Figure 3 is a fragmentary view of the ring for holding the cross strainer in position;

Figures 4 and 5 are plan and side elevations, respectively, of a wire ring for securing the same results.

The device of my invention comprises a mixing or preparing vessel 1 which is adapted to be set upon the open top of a containing vessel 2, such as a coffee pot or the like. The preparing or mixer section 1 is tapering in general contour and formed with a concavo-convex peripheral wall 3 to adapt the vessel to be usable with containers of various sizes. Suitable wire handles 4 and 5 and a suitable cover 6 are provided, the latter for closing off the top of the vessel 1. This cover is provided with a handle 7. The bottom of the vessel 1 is provided with a depending chamber 8 forming a continuation of the tapered walls 3 of the vessel and forming a substantially sharp corner 9 at the point of juncture. The bottom wall of the chamber 8 is perforated to form a strainer for retaining the coffee grounds 11 or the like which are employed in preparing the beverage. The capacity of the chamber 8 is relatively such that the grounds will more than fill the same. A suitable hollow valve 12 having a relatively flat broad supporting surface at its bottom is provided for closing off the chamber 8 from the rest of the vessel 1 while the beverage is being prepared. It is to be noted that the valve 12 is provided with a concave annular face 13, the face 13 being in engagement with the shoulder 9 to form the closure between the chamber 8 and the rest of the vessel 1. The curve of the face of the valve 12 is preferably the arc of a circle although any other suitable curve may be employed, as the object of this shape of valve is to prevent marring of the curved valve surface when the valve is removed from the seat and to secure substantially a line of peripheral contact in order to prevent grounds of coffee or the like from holding the valve off of its seat, as would be the case with a plain cone valve. The valve 12 is made hollow in order to reduce the weight thereof while permitting a large area of valve seat opening to be secured. A cylindrical stem 16 projects upward through the cover 6 and the handle 7 in position to be readily grasped by the operator or attendant.

A suitable screen of cloth or similar material may be secured below the screen 10 as by means of a ring shown in Figures 2 and 3. The cloth screen 17 is laid over the chamber 8 and the ring 18 which is preferably given a slight taper, as indicated in Figure 3, is then forced over the screen 17 holding the same firmly in position upon the chamber 8. A wire ring, such as is shown in Figures 4 and 5, may be employed if desired. This ring 19 is formed of spring wire having overlapping ends 20 and 21 which are adapted to be grasped between the thumb and finger of the operator in applying or removing the same.

The operation of the device above described is as follows: The mixer vessel 1 is placed on the open top of the container vessel 2 with the valve 12 firmly engaged with the seat 9. The proper material for preparing the beverage, such as coffee, tea, or the like, is then placed on top of the valve 12 and sufficient water is poured upon the same to prepare the proper amount of beverage. The cover 6 is then put in place and the mixture is allowed to stand for a suitable period. When it is desired to discharge the beverage into the container 2 the valve 12 is raised by grasping the stem 16 and raising the same. Due to the sloping walls 3 and due to the proportion of the parts, particularly the slight depth of the chamber 8, the coffee grounds 11 or the like material will at once be discharged into the chamber 8 and will more than fill said chamber. The operator after raising the valve 12 allows the same to drop down but the valve does not again close off the opening due to the fact that the coffee grounds more than fill the chamber 8. The valve 12 being hollow and therefore relatively light rests lightly upon the grounds 11 and therefore does not hinder the passage of the beverage through the grounds. It is obvious that any required degree of lightness may be obtained in the valve 12; in fact, the same may be made so that it will float upon being released from its seat 9.

It is apparent from the above description that due to the proportion of the straining chamber 8 and the valve 12 it is unnecessary to provide any means for holding the valve 12 in raised position. I secure a thorough straining of the beverage in relatively quick time. After once having raised the valve 12 no further attention need be given the same.

I claim:—

1. In a percolating utensil of the class described having an upper percolating chamber and a lower straining chamber of lesser diameter, the combination of a sharp valve seat formed at the juncture of said chambers, a valve removable from said percolating chamber and adapted to seat on said valve seat, said valve being of light sheet metal construction and having an extensive supporting surface of relatively large diameter on its bottom to avoid packing of the grounds, the seat contacting portion of said valve consisting of an annular concave valve face adapted for circumferential line contact with said valve seat, said line contact occurring on said concave valve face at a circumferential line intermediate the maximum and minimum peripheries of said concave valve face, whereby said seat contacting portion is protected against marring.

2. In a coffee percolator of the class described, having an upper percolating chamber and a lower straining chamber of lesser diameter, the combination of a relatively sharp valve seat formed at the juncture of said chambers, a valve disposed in said precolating chamber and adapted to seat on said valve seat, said valve being of light, hollow construction and having a relatively broad supporting surface at its bottom to avoid packing of the grounds, the seat contacting portion of said valve consisting of an annular concave valve face adapted to engage with said valve seat on a circumferential line in said valve face intermediate the maximum and minimum peripheries thereof, whereby said seat contacting portion is protected against marring and is enabled to remove grounds from the valve face and valve seat.

3. In a valve for the purpose specified, the combination of a valve seat having a sharp contacting edge, a valve adapted for line contact therewith, said valve being of relatively short axial length and of a diameter considerably greater than its length, said valve being of light hollow construction having a relatively flat broad supporting surface on its bottom to permit the support of said valve off said valve seat by the ingredients precipitated through the latter, the seat contacting portion of said valve consisting of an annular concave valve face adapted for circumferential line contact with said valve seat, said line contact occurring on said concave valve face at a circumferential line intermediate the maximum and minimum peripheries of said concave valve face, whereby the seat contacting portion of the valve face is protected against marring.

In witness whereof, I hereunto subscribe my name this 28th day of June, A. D. 1916.

OLAF TOLLAGSEN.